(12) United States Patent
Balmas et al.

(10) Patent No.: US 7,006,896 B1
(45) Date of Patent: Feb. 28, 2006

(54) SEALANT DISPENSING CORRECTION METHOD

(75) Inventors: Joseph A. Balmas, St. Clair Shores, MI (US); Neal A. Werner, Bloomington, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 677 days.

(21) Appl. No.: 09/687,895

(22) Filed: Oct. 13, 2000

Related U.S. Application Data

(60) Provisional application No. 60/159,141, filed on Oct. 13, 1999.

(51) Int. Cl.
*G05D 7/00* (2006.01)

(52) U.S. Cl. ..................................... 700/282
(58) Field of Classification Search ............... 700/275, 700/282–285, 301; 702/45, 47, 50, 55
See application file for complete search history.

(56) References Cited

U.S. PATENT DOCUMENTS

| | | | |
|---|---|---|---|
| 4,250,553 A * | 2/1981 | Sebens et al. .............. 700/282 |
| 4,468,219 A * | 8/1984 | George et al. ................ 604/66 |
| 4,662,540 A | 5/1987 | Schroter ..................... 222/55 |
| 4,922,852 A | 5/1990 | Price .......................... 118/683 |
| 5,045,057 A * | 9/1991 | Van Driessche et al. .... 604/540 |
| 5,054,650 A | 10/1991 | Price ............................. 222/1 |
| 5,178,603 A * | 1/1993 | Prince ....................... 604/6.01 |
| 5,312,016 A | 5/1994 | Brennan et al. .............. 222/55 |
| 5,319,568 A | 6/1994 | Bezaire ..................... 364/479 |
| 5,332,125 A | 7/1994 | Schmitkons ................... 222/1 |
| 5,404,758 A * | 4/1995 | Huber et al. ............. 73/861.58 |
| 5,483,838 A * | 1/1996 | Holden ..................... 73/861.61 |
| 5,536,237 A * | 7/1996 | Prince et al. .............. 604/6.11 |
| 5,687,092 A | 11/1997 | Bretmersky et al. ........ 364/510 |
| 5,730,819 A | 3/1998 | Retti ........................... 156/71 |
| 5,847,285 A * | 12/1998 | Box ........................... 73/861 |
| 5,920,829 A * | 7/1999 | Bretmersky et al. .......... 702/50 |
| 5,947,692 A * | 9/1999 | Sahlin et al. .............. 417/44.3 |
| 5,968,588 A * | 10/1999 | Sivaramakrishnan et al. .. 427/8 |
| 5,995,909 A * | 11/1999 | Bretmersky et al. .......... 702/50 |
| 6,824,012 B1 * | 11/2004 | Werner .......................... 222/1 |

\* cited by examiner

*Primary Examiner*—Maria N. Von Buhr
(74) *Attorney, Agent, or Firm*—Douglas B. Farrow

(57) ABSTRACT

As the command signal to a unit for dispensing sealant is modified, the pressure range for the calibrated point is either extrapolated or interpolated as necessary in order to achieve the correct flow rate. As a result, each time the unit dispenses, it is also recalibrated. This method provides immediate correction for changes in system fluid dynamics thus allowing for a more consistent and predictable dispense profile.

1 Claim, 2 Drawing Sheets

SEALANT DISPENSING CORRECTION METHOD

RELATED APPLICATIONS

This application is a continuation-in-part of U.S. Application Ser. No. 60/159,141, filed Oct. 13, 1999.

BACKGROUND OF THE INVENTION

Apparatus for dispensing sealants and adhesives and similar materials robotically are well known and typified by U.S. Pat. No. 5,847,285 (the contents of which are incorporated by reference) and the patents referenced and cited therein.

SUMMARY OF THE INVENTION

In summary, the method of the instant invention forms a calibrated relationship between pressure and flow rate. The invention as described herein can be utilized in products such as Graco's PrecisionFlo™ dispenser as a software modification. Pressure is measured with a transducer device which provides a 1 to 5 volt output which corresponds to 0 to 3500 PSI. The voltage is converted to a pulse width using an external analog to digital device. Flow rate is measured with a helical type flow meter which provides a pulse corresponding to a calibrated volume passing through it.

The relationship is discovered by dispensing an amount of material and measuring the pressure and flow rate, adjusting the pressure until a user specified flow rate (typically the max flow rate) is achieved within a tolerance. This process is then repeated eight (8) times and a mean pressure to flow rate relationship is established and recorded. The set point for the device is then assumed to be a linear function with the calibrated point as the maximum value and 0,0 is the minimum value.

As the command signal to the unit is modified (for dispensing sealant at a percentage of maximum, e.g. if calibrated at 500 cc/min., a half range signal would represent a 250 cc/min. command) the pressure range for the calibrated point is either extrapolated or interpolated as necessary in order to achieve the correct flow rate. As a result, each time the unit dispenses, it is also recalibrated. This method provides immediate correction for changes in system fluid dynamics thus allowing for a more consistent and predictable dispense profile.

In the preferred embodiment of the instant invention, where the example aforementioned has the max flow rate of 500 cc/min., a half scale level of 250 cc/min. is utilized. The response curve is divided into two segments above and below the median speed dip (half flow rate point) and the slope of the straight line is adjusted accordingly.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

DESCRIPTION OF THE PREFERRED EMBODIMENT

In summary, the method of the instant invention forms a calibrated relationship between pressure and flow rate. The invention as described herein can be utilized in products such as Graco's PrecisionFlo™ dispenser as a software modification. Pressure is measured with a transducer device which provides a 1 to 5 volt output which corresponds to 0 to 3500 PSI. The voltage is converted to a pulse width using an external analog to digital device. Flow rate is measured with a helical type flow meter which provides a pulse corresponding to a calibrated volume passing through it.

The relationship is discovered by dispensing an amount of material and measuring the pressure and flow rate, adjusting the pressure until a user specified flow rate (typically the max flow rate) is achieved within a tolerance. This process is then repeated eight (8) times and a mean pressure to flow rate relationship is established and recorded. The set point for the device is then assumed to be a linear function with the calibrated point as the maximum value and 0,0 is the minimum value.

As the command signal to the unit is modified (for dispensing sealant at a percentage of maximum, e.g. if calibrated at 500 cc/min., a half range signal would represent a 250 cc/min. command) the pressure range for the calibrated point is either extrapolated or interpolated as necessary in order to achieve the correct flow rate. As a result, each time the unit dispenses, it is also recalibrated. This method provides immediate correction for changes in system fluid dynamics thus allowing for a more consistent and predictable dispense profile.

Figure 1:
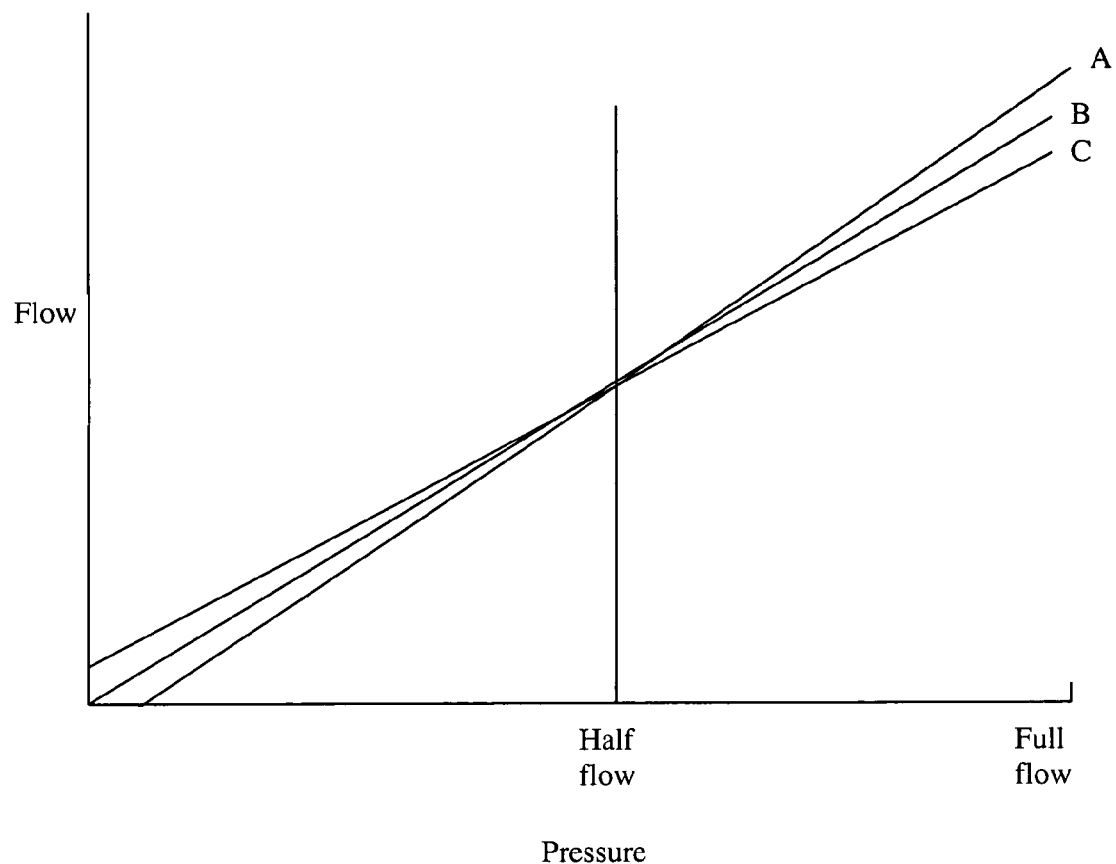
FIG. 1 shows the pressure/flow table as initially established and after adjustment.
Figure 2:
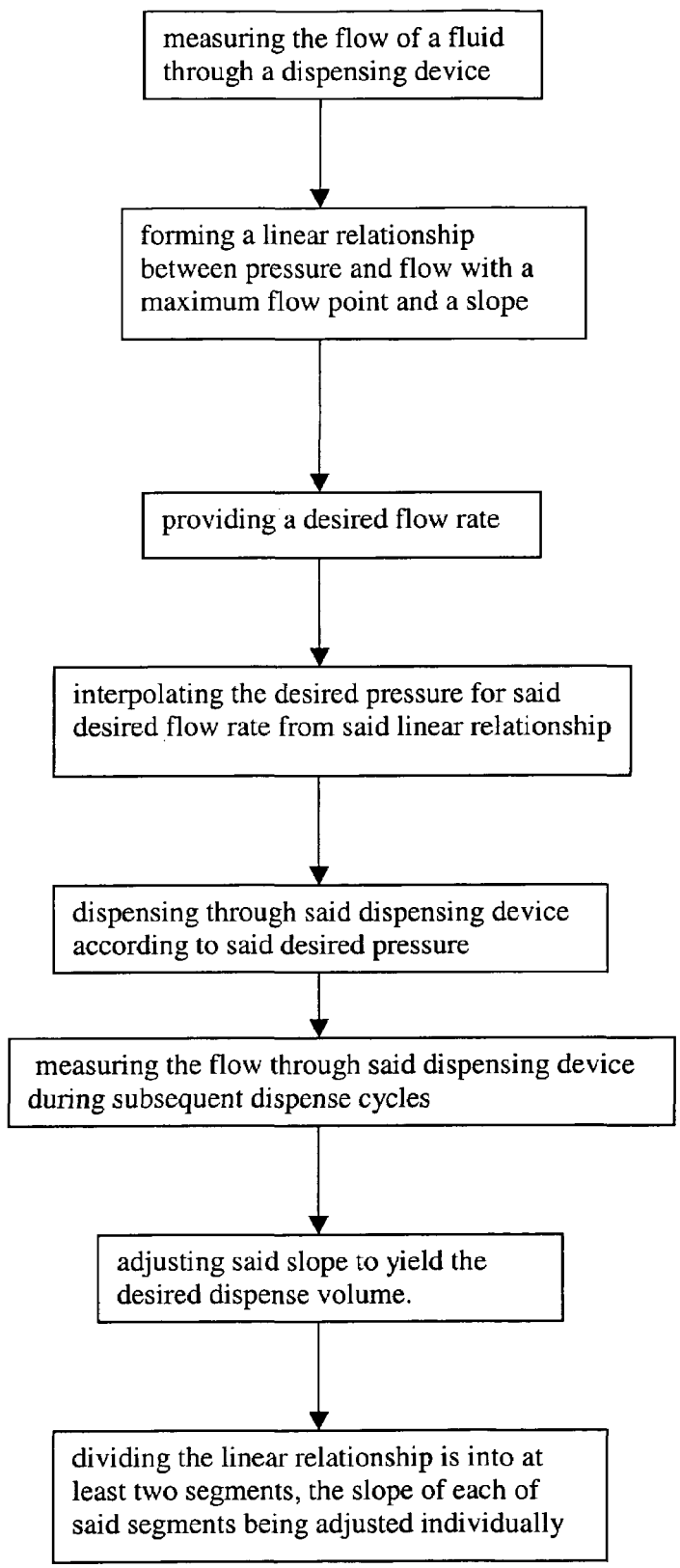
FIG. 2 shows a flowchart of the instant invention.

In the preferred embodiment of the instant invention, where the example aforementioned has the max flow rate of 500 cc/min., a half scale level of 250 cc/min. is utilized. The response curve is divided into two segments above and below the median speed dip (half flow rate point) and the slope of the straight line is adjusted accordingly. For example, in FIG. 1, slope B represents the initial calibration while slopes A and C represent corrected linear relationships.

It is contemplated that various changes and modifications may be made to the dispensing correction method without departing from the spirit and scope of the invention as defined by the following claims.

What is claimed is:
1. A method for flow correction of the calibrated relationship between pressure and flow rate comprising the steps of:
   initially measuring the flow of a fluid through a dispensing device and forming a linear relationship between pressure and flow, said linear relationship having a maximum flow point and a slope;
   providing a desired flow rate;
   interpolating the desired pressure for said desired flow rate from said linear relationship;
   dispensing through said dispensing device according to said desired pressure; and
   measuring the flow through said dispensing device during subsequent dispense cycles and adjusting said slope to yield the desired dispense volume wherein said linear relationship is divided into at least two segments, the slope of each of said segments being adjusted individually.

* * * * *